US009608537B1

(12) United States Patent
Lee (10) Patent No.: US 9,608,537 B1
(45) Date of Patent: Mar. 28, 2017

(54) ACTIVE RECTIFIER AND REGULATOR CIRCUIT (71) Applicant: ALFRED E. MANN FOUNDATION FOR SCIENTIFIC RESEARCH, Santa Clarita, CA (US)

(72) Inventor: Edward K. F. Lee, Fullerton, CA (US)

(73) Assignee: ALFRED E. MANN FOUNDATION FOR SCIENTIFIC RESEARCH, Santa Clarita, CA (US)

( * ) Notice: Subject to any disclaimer, the term of this patent is extended or adjusted under 35 U.S.C. 154(b) by 127 days.

(21) Appl. No.: 14/491,845

(22) Filed: Sep. 19, 2014

(51) Int. Cl.
H02M 7/217 (2006.01)
H02J 5/00 (2016.01)

(52) U.S. Cl.
CPC ............ H02M 7/217 (2013.01); H02J 5/005 (2013.01)

(58) Field of Classification Search
CPC ............................ H02M 7/217; H02J 5/005
USPC .................................................. 323/271–281
See application file for complete search history.

(56) References Cited

U.S. PATENT DOCUMENTS

| 6,487,100 | B2 | 11/2002 | Watanabe et al. | |
|---|---|---|---|---|
| 6,831,378 | B2 | 12/2004 | Watanabe et al. | |
| 7,738,272 | B2 | 6/2010 | Klapf et al. | |
| 2007/0210782 | A1* | 9/2007 | Prexl | H02M 3/1582 323/288 |
| 2008/0259665 | A1* | 10/2008 | Brederlow | H02M 7/217 363/127 |
| 2011/0050188 | A1* | 3/2011 | Wang | H02M 3/156 323/282 |
| 2012/0013317 | A1* | 1/2012 | Morino | G05F 1/565 323/280 |

OTHER PUBLICATIONS

Search resport from STIC EIC 2800 searcher Eileen Patton.*
Lee, Edward K. F., "An Active Rectifier/Regulator Combo Circuit for Powering Biomedical Implants," Proceedings of the IEEE 2013 Custom Integrated Circuits Conference, CICC Sep. 22-25, 2013, 4 pgs.

* cited by examiner

Primary Examiner — Jue Zhang
Assistant Examiner — Htet Z Kyaw
(74) Attorney, Agent, or Firm — Morgan, Lewis & Bockius LLP (57) ABSTRACT The various embodiments described herein include systems, methods and/or devices used to produce a rectified and regulated output signal. In one aspect, the method includes, at a circuit, comparing an output signal at an output node with an input signal at an input node, wherein the output signal is a rectified and regulated signal, and the input signal is an unrectified and unregulated signal, and computing a difference between a reference signal and a comparison signal. Power transfer from the input node to the output node is prevented when the output signal is greater than the input signal. Furthermore, power transfer from the input node to the output node is regulated to produce the rectified and regulated output signal when both the input signal is greater than the output signal, and when the magnitude of the reference signal exceeds the magnitude of the comparison signal.

16 Claims, 8 Drawing Sheets

ACTIVE RECTIFIER AND REGULATOR CIRCUIT

TECHNICAL FIELD

The present invention relates generally to circuits that produce a rectified and regulated output signal, and more particularly to such a circuit used for powering biomedical implants.

BACKGROUND

Many biomedical applications require wireless delivery of power to an implanted device from an external source outside of a patient's body. Such applications typically use inductive coupling to achieve wireless delivery of power, where a primary coil external to the patient's body is inductively coupled to and powers a secondary coil located inside an implanted device. Wireless transfer of power can be used to power the implanted device, or recharge batteries located inside the implanted device.

Typically, the signal on the secondary coil is received as an AC signal. As such, it is often necessary to convert the AC signal to a DC voltage using a rectifier. Because the magnetic field strength and hence, the AC signal, may vary due to changes in the distance between the primary coil and the implant, the DC voltage is typically regulated to the required supply voltages using a linear regulator.

Conventional designs using both a rectifier circuit and a linear regulator circuit, however, have a number of shortcomings. In particular, such designs often require numerous, and sometimes large, circuit components, which impact the limited space of the typically small implants. Furthermore, such conventional designs suffer from low voltage conversion efficiency and low power efficiency.

Accordingly, there is a need for a design that is more compact, uses fewer components, and that achieves improved device performance and efficiencies.

SUMMARY

Some embodiments provide a method for producing a rectified and regulated output signal. In particular, the method includes, at a circuit, comparing an output signal at an output node with an input signal at an input node, wherein the output signal is a rectified and regulated signal, and the input signal is an unrectified and unregulated signal, and computing a difference between a reference signal and a comparison signal, where the comparison signal is based on the output signal. Power transfer from the input node to the output node is prevented when the output signal is greater than the input signal. Furthermore, power transfer from the input node to the output node is regulated to produce the rectified and regulated output signal when both the input signal is greater than the output signal, and when the magnitude of the reference signal exceeds the magnitude of the comparison signal.

In some embodiments, the comparison signal is a scaled version of the output signal. In some embodiments, the comparison signal is the output signal. Furthermore, in some embodiments, the input signal is an AC voltage and the output signal is a DC voltage.

In some embodiments, the method includes preventing power transfer from the input node to the output node when the magnitude of the comparison signal exceeds the magnitude of the reference signal.

In some embodiments, the circuit includes a field effect transistor (FET), wherein regulating power transfer includes enabling the FET and coupling the output node to the input node, and preventing power transfer includes disabling the FET and preventing the output node from being coupled to the input node.

In some embodiments, the reference signal is a reference voltage selected in accordance with a desired output signal.

Another aspect includes a circuit for producing a rectified and regulated output signal. The circuit includes an input node configured to be coupled to an input signal, wherein the input signal is an unrectified and unregulated signal, and an output node configured to provide an output signal, wherein the output signal is a rectified and regulated signal. Furthermore, the circuit includes a comparator, comprising: a first input node of the comparator configured to be coupled to the input node; a second input node of the comparator configured to be coupled to the output node; and a comparator output node, wherein the comparator is configured to produce a switching signal at the comparator output node. The circuit also includes an error amplifier, comprising: a first input node of the error amplifier configured to be coupled to a reference signal; a second input node of the error amplifier configured to be coupled to a comparison signal, where the comparison signal is based on the output signal; and an error amplifier output node, wherein the error amplifier is configured to produce an output voltage at the error amplifier output node, wherein coupling of the input node to the output node is based on the switching signal at the comparator output node and the output voltage at the error amplifier output node.

In some embodiments, the comparison signal is a scaled version of the output signal. In some embodiments, the input signal is an AC voltage and the output signal is a DC voltage. Furthermore, in some embodiments, the reference signal is a reference voltage selected in accordance with a desired output signal.

In some embodiments, the circuit further includes a switch driver circuit, comprising: a FET configured to couple the input node and output node; a first switch configured to couple the error amplifier output node to the FET; and a second switch configured to couple the output node to the FET, wherein the switching signal produced by the comparator enables one of the first switch and second switch, while not enabling the other of the first switch and second switch.

In some embodiments, the second input node of the error amplifier is coupled to the output node through a voltage divider circuit.

In some embodiments, the switching signal enables the first switch and couples the error amplifier output node to the FET when the input signal exceeds the output signal. Furthermore, in some embodiments, the output voltage enables the FET, allowing power transfer between the input node and the output node. In some embodiments, the output voltage is based on the difference between the reference signal and the comparison signal.

In some embodiments, the switching signal enables the second switch and couples the output node to the FET when the output signal exceeds the input signal. Furthermore, in some embodiments, coupling the output node to the FET causes the FET to prevent power transfer between the input node and the output node.

The embodiments described herein offer significant advantages over traditional techniques and designs. As one example, the disclosed embodiments minimize the number of required off-chip components, thereby achieving improved space efficiency. Furthermore, because the disclosed design improves performance by minimizing dropout voltage, design specifications for certain circuit components can be less restrictive, thus further reducing size by minimizing the die area. Consequently, voltage conversion efficiency and power efficiency are also improved.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the embodiments described herein.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate the more pertinent features of the present disclosure and are therefore not to be considered limiting, for the description may admit to other effective features.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The following is a detailed description of various embodiments of a circuit combining a rectifier and a linear regulator, and their method of operation.

It is to be understood that, although the example embodiments of the half and full-wave combined rectifier and regulator circuits discussed herein relies on the use of NMOS and PMOS field effect transistors (FETs) for specific components of their design, in some embodiments, NMOS and PMOS devices may be used interchangeably, provided that the appropriate voltage polarity considerations known and appreciated by those skilled in the art are taken into account. Furthermore, it is to be understood that with reference to components or devices that are "coupled" to other components, devices, voltage and current sources and ground, etc., the term coupled includes the instance when the coupling is "direct" (i.e., no other components are involved in the path from the subject device or component to its defined terminus) and the instance when the coupling is "indirect" (i.e., other devices or components may lie in the path from the subject device or component to its defined terminus). Furthermore, as used throughout, the magnitude of a signal is an absolute value.

In the following figures, NMOSs and PMOSs will be used in exemplary embodiments of circuit devices. The NMOS has a threshold voltage denoted as Vtn and the PMOS has a threshold voltage denoted as Vtp. A typical value for the threshold voltages is 0.5 volts for an exemplary 0.18 um CMOS process. Furthermore, unless otherwise specified, the bulk terminals of all the PMOS FETs are connected to their corresponding source terminals so that the voltage across the drain and source terminals of all the PMOS FETs will not exceed the transistor operating voltage limits and the corresponding parasitic diodes/transistors will not turn on. In some embodiments, the circuit components disclosed below are implemented by one or more circuit elements, such as FETs (e.g., NMOS or PMOS), diodes, resistors, capacitors, and/or any other suitable combination of active or passive elements.

Figure 1:
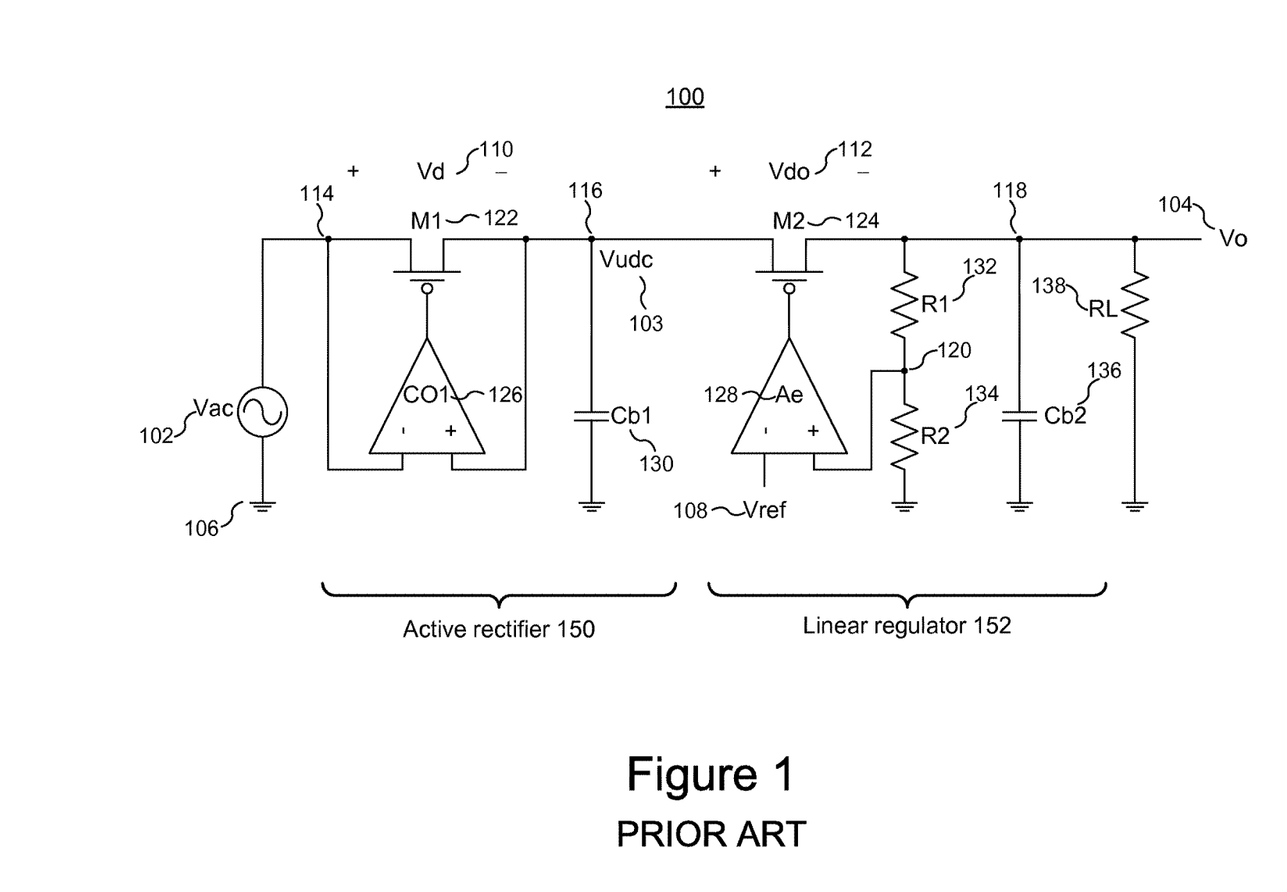
FIG. 1 is a schematic illustrating an active rectifier in series with a linear regulator, in accordance with a conventional circuit system.

FIG. 1 is a schematic diagram illustrating an active rectifier in series with a linear regulator, in accordance with a conventional circuit system. The circuit (100) includes an active rectifier (150) in series with a linear regulator (152). The active rectifier (150) consists of a comparator CO1 (126), a first FET M1 (122), and a first capacitor Cb1 (130). Furthermore, the linear regulator (152) consists of an error amplifier Ae (128), a second FET M2 (124), and a capacitor Cb2 (136). As shown, the circuit 100 comprises an input signal Vac (102) coupled to an input node (114), an output signal Vudc (103) at an output node (116), an output signal Vo (104) at an output node (118), and a ground terminal (106). Furthermore, as shown, the input signal Vac (102) is an unrectified and unregulated signal, the output signal Vudc (103) is an unregulated and rectified signal, and the output signal Vo (104) is a rectified and regulated signal. The conventional circuit (100) also includes resistors R1 (132), R2 (134), and RL (138). Resistor RL (138) is the equivalent loading resistance connected to the output signal Vo (104). As described below, the active rectifier (150) rectifies the unrectified and unregulated input signal Vac (102) to the rectified and unregulated output signal Vudc (103), which the linear regulator (152) then regulates to produce the rectified and regulated output signal Vo (104).

In conventional circuit systems, the input signal Vac (102) is sometimes a time-varying voltage, such as a radio frequency (RF) or alternating current (AC) signal, and the output signal Vo (104) is a direct current (DC) signal. For example, in the context of implantable devices, the input signal Vac (102) is an induced RF signal generated by a secondary coil located within an implanted device, where the secondary coil is inductively coupled to a primary coil located at an external controller outside the body.

At the active rectifier (150), the comparator CO1 (126) compares the output signal Vudc (103) with the input signal Vac (102). When the output signal Vudc (103) exceeds the input signal Vac (102), the comparator CO1 (126) produces a signal corresponding to a logic "low" value at the gate of the first FET M1 (122). Consequently, the first FET M1 (122) conducts and couples the input node (114) to the output node (116), which begins charging the first capacitor Cb1 (130). The error amplifier Ae (128) of the linear regulator (152) computes the difference between the reference voltage Vref (108) and a scaled signal at a node (120), where the scaled signal corresponds to a scaled version of the output signal Vo (104). When the difference between the reference voltage Vref (108) and the scaled signal at the node (120) is higher than zero, the second FET M2 (124) will have higher current flowing to the output node (116) to the output signal Vo (104). When the difference between the reference voltage Vref (108) and the scaled signal to the node (120) is lower than zero, the second FET M2 (124) is lower than zero, the second FET M2 (124) will have less current flowing to the output node (116) to the output signal Vo (104). The current flow through the second FET M2 (124) is controlled by the output voltage of the error amplifier Ae (128). By monitoring the output signal Vo (104) and controlling the second FET M2 (124) in this manner, the signal (e.g., output signal Vo (104)) at the output node (118) is regulated.

Because two FETs are needed to realize the conventional circuit system of FIG. 1, the maximum output voltage that can be achieved, and thus the voltage conversion efficiency (as described below), is limited as a result of the finite on-resistance of transistors (e.g., the first FET M1 (122) and the second FET M2 (124)). In other words, for a desired output voltage Vo, the minimum peak voltage requirement for Vac, min[Vacp], is equal to: Vo+Vdo+Vd, where Vd (110) is the dropout voltage measured across the first FET M1 (122), and Vdo (112) is the dropout voltage measured across the second FET M2 (124).

Figure 2:
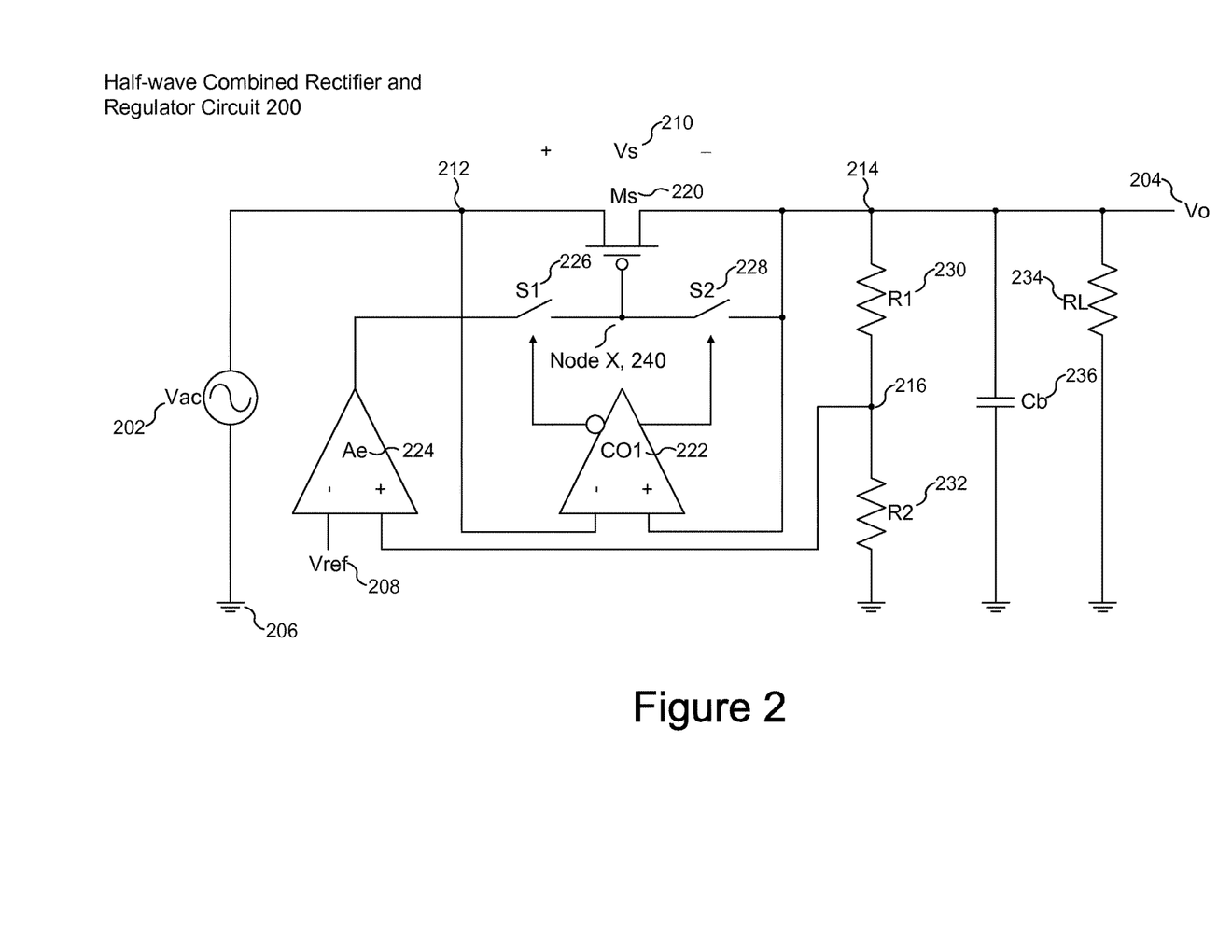
FIG. 2 is a schematic diagram of a half-wave combined rectifier and regulator circuit, in accordance with some embodiments.

FIG. 2 is a schematic diagram of a half-wave combined rectifier and regulator circuit (200), in accordance with some embodiments. The half-wave combined rectifier and regulator circuit (200) of FIG. 2 and the full-wave combined rectifier and regulator circuit (300) of FIGS. 3A-3B address the various shortcomings of the circuit shown in FIG. 1, thereby achieving improvements in at least space efficiency, voltage conversion efficiency, and maximum power efficiency. The combined rectifier and regulator circuit (200) is a rectifier circuit that combines the functionality of a linear regulator, distinct from the conventional circuit (100) of FIG. 1 in which an active rectifier circuit is connected in series with a separate linear regulator circuit.

In some embodiments, the half-wave combined rectifier and regulator circuit (200) of FIG. 2 comprises a FET Ms (220), a comparator CO1 (222), an error amplifier circuit Ae (224), and switches S1 (226) and S2 (228). The half-wave combined rectifier and regulator circuit (200) also comprises an input signal Vac (202) coupled to an input node (212), an output signal Vo (204) at an output node (214), a reference voltage Vref (208), and a ground terminal (206). As shown, the output signal Vo (204) is a rectified and regulated signal, and the input signal Vac (202) is an unrectified and unregulated signal As described above with respect to FIG. 1, in some embodiments, the input signal Vac (202) is a time-varying voltage, such as a RF or AC signal, and the output signal Vo (204) is a DC signal. As described in greater detail below, the embodiment of the half-wave combined rectifier and regulator circuit (200) shown in FIG. 2 enables half-wave rectification and regulation of the input signal Vac (202) into the output signal Vo (204) by selectively operating the FET Ms (220), particularly by utilizing the comparator CO1 (222), the error amplifier Ae (224), and the switches S1 (226) and S2 (228). Furthermore, although the operation of the half-wave combined rectifier and regulator circuit (200) is described below with respect to one polarity of the input signal Vac (202), the half-wave combined rectifier and regulator circuit (200) operates in equivalent fashion with respect to the other cycle of the input signal Vac (202) (e.g., the input signal Vac1 (311) and the input signal Vac2 (312) of the full-wave combined rectifier and regulator circuit (300), FIG. 3A).

Some embodiments also include resistors R1 (230), R2 (232), and RL (234). Resistors R1 (230) and R2 (232) scale the output signal Vo (204) to a scaled output signal at node (216). RL (234) is the equivalent output loading resistance to the combined rectifier and regulator. In combination with the reference voltage Vref (208), resistors R1 (230) and R2 (232) are selected to achieve a desired output voltage, expressed as: Vref (1+R1/R1). However, due to the finite on-resistance of transistors, for a desired output voltage Vo, the minimum peak voltage requirement min[Vacp] of the input signal Vac (202) is equal to: Vo+Vs, where Vs (210) is the dropout voltage measured across the FET Ms (220).

Some embodiments also include a filter capacitor Cb (236) (sometimes referred to as a smoothing or reservoir capacitor) to produce a steady DC voltage signal from a rectified AC signal (i.e., minimizing ripples in output signal Vo (204)).

The FET Ms (220) is configured to selectively couple the input node (212) to the output node (214), thereby controlling the flow of current across the FET Ms (220) and between the two nodes. In the embodiment shown, the FET Ms (220) is a PMOS FET, comprising a source or drain terminal coupled to the input signal Vac (202) at the input node (212), a drain or source terminal coupled to the output signal Vo (204) at the output node (214), and a gate terminal at node X (240) that is selectively coupled to either the output signal Vo (204) through switch S2 (228), or the output of the error amplifier Ae (224) through switch S1 (226). When the input signal Vac (202) is higher than the output signal Vo (204), the comparator CO1 (222) will detect this condition. It will turn on switch S1 (226) and turn off switch S2 (228) such that node X (240) is coupled to the output of the error amplifier Ae (224). The error amplifier will compute the difference between the average value of the output signal Vo (204) and the reference voltage Vref (208). The error amplifier outputs an analog control voltage coupled to node X (240). The voltage at node X (240) will be lower than the input signal Vac (202), since the output signal Vo (204) is lower than the input signal Vac (202), The input node (212) is the source terminal of the FET Ms (220), and the output node (214) is the drain terminal of the FET Ms (220). Current can flow from the input signal Vac (202) to the output node (214) and to any load coupled to the output node (214). Therefore, the output voltage Vo (204) is rectified.

To control the current flow through the FET Ms (220), the difference between the average value of the output signal Vo (204) times the resistor divider gain given as R2/(R1+R2) and the reference voltage Vref (208) is computed by the error amplifier Ae (224). Based on this computation, the error amplifier Ae (224) will set the analog control voltage at node X (240) and control the current flow such that the average value of the output signal Vo (204) times the resistor divider gain given as R2/(R1+R2) is equal to the reference voltage Vref (208). Therefore, the output signal Vo (204) is both rectified and regulated to the desired value given as Vref (1+R1/R2).

When the input signal Vac (202) is lower than the output signal Vo (204), the comparator CO1 (222) will detect this condition. It will turn on switch S2 (228) and turn off switch S1 (226). Node X (240) is then coupled to the output signal Vo (204), since the output signal Vo (204) is higher than the input signal Vac (202). Node 214 becomes the source terminal of the FET Ms (220) and node 212 becomes the drain terminal of the FET Ms (220). With the gate voltage of the FET Ms (220) equal to the drain terminal voltage of the FET Ms (220), there will be no current flow between the input signal Vac (202) and the output signal Vo (204). Therefore, the output voltage (204) is rectified and remains approximately the same value due to the current supplied from the reservoir capacitor Cb (236) to the equivalent load resistance RL (234), as well as to resistors R1 (230) and R2 (232). As shown in this embodiment, the FET Ms (220) together with the comparator CO1 (222) performs the function of rectification by switching on and off the FET Ms (220) according to the difference between the input signal Vac (202) and the output signal Vo (204). When the input signal Vac (202) is higher than the output signal Vo (204), the FET Ms (220) together with the error amplifier Ae (224) performs the function of regulation using an analog control voltage on node X (240) to control the current flow on the FET Ms (220) such that the average value of the output signal Vo (204) is regulated to the desired value given as $Vref \cdot (1+R1/R2)$.

The signal driving the gate terminal of the FET Ms (220) will depend on which of the two switches S1 (226) and S2 (228) is enabled or closed. In the embodiment of FIG. 2, the comparator CO1 (222) is configured to produce a switching signal that selectively enables switches S1 (226) and S2 (228). As shown, the comparator CO1 (222) comprises a first input node coupled to the input node (212), a second input node coupled to the output node (214), and an output comprising an inverted output node coupled to the switch S1 (226), and a non-inverted output node coupled to the switch S2 (228). In some embodiments, switches S1 (226) and S2 (228) are implemented as NMOS FETs, although one skilled in the art will appreciate that switches S1 (226) and S2 (228) can be implemented by one or more other circuit components, such as FETs (e.g., NMOS or PMOS), diodes, resistors, capacitors, and/or any other suitable combination of active or passive circuit elements.

The comparator CO1 (222) compares the input signal Vac (202) with the output signal Vo (204) and produces a switching signal at the output of the comparator CO1 (222). More specifically, if the output signal Vo (204) exceeds the input signal Vac (202), the produced switching signal corresponds to a logic "high" value which, if satisfying the corresponding device threshold requirements of the switches, enables (closes) switch S2 (228) and disables (opens) switch S1 (226). Consequently, the gate terminal of FET Ms (220) will be coupled to the output node (214) and thus the FET Ms (220) does not conduct (i.e., is opened or turned "off"), thus preventing current flow from the input node (212) to the output node (214). Alternatively, if the input signal Vac (202) exceeds the output signal Vo (204), the produced switching signal corresponds to a logic "low" value, enabling (closing) switch S1 (226) and disabling (opening) switch S2 (228). As a result, the gate terminal of the FET Ms (220) will be electrically coupled to the output of the error amplifier Ae (224).

In contrast to the conventional design of FIG. 1, the comparator CO1 (222) of FIG. 2 compares a rectified and regulated DC signal (e.g., output signal Vo (204)) to an unrectified and unregulated AC signal (e.g., input signal Vac (202)), whereas the comparator CO1 (126) in the embodiment of FIG. 1 compares a rectified and unregulated DC signal (e.g., output signal Vudc (116)) to an unrectified and unregulated AC signal (e.g., input signal Vac (102)).

The error amplifier Ae (224), when coupled to the terminal of the FET (220), drives the gate of the FET Ms (220), and thus controls both the current flow from and regulates the power transferred between the input node (212) to the output node (214) to produce the rectified and regulated output signal Vo (204). In the embodiment shown in FIG. 2, the error amplifier Ae (224) comprises a first input node coupled to the reference voltage Vref (208), a second input node coupled to the scaled output signal at node (216), and an output node coupled to the gate of FET (220) through switch S1, when enabled. In some embodiments, the error amplifier circuit Ae (224) computes the difference between the scaled output signal at node (216) and the reference voltage Vref (208), and produces an output voltage at the output node (214) that controls the FET Ms (220). In some embodiments, the output voltage produced at the output node (214) is an analog gate control voltage. Alternatively, in some embodiments, the error amplifier Ae (224) computes the difference between the output signal Vo (204) and the reference voltage Vref (208) to produce the output voltage that is based on the computed difference. The error amplifier Ae (224) provides linear regulator functionality by computing the difference between the output signal (or a scaled version thereof, as shown) and a stable reference voltage. The resulting output voltage moderates the conductivity of the FET Ms (220), thus regulating power transfer from the input node (212) to the output node (214) and maintaining the desired output signal Vo (204). More specifically, when the magnitude of the reference voltage Vref (208) does not exceed the magnitude of the scaled output signal at node (216), the FET Ms (220) does not conduct (i.e., is opened or turned "off") and current will not flow from the input node (212) to the output node (214), thereby causing power transfer to be interrupted. However, when the magnitude of the reference voltage Vref (208) exceeds the magnitude of the scaled output signal at node (216), the FET Ms (220) conducts (i.e., is closed or turned "on") and current then flows from the input node (212) to the output node (214). As a result, power transfer from the input node (212) to the output node (214) (and thus, the power transferred to any load coupled to the output node (214), such as resistor RL (234)), is regulated to produce the rectified and regulated output signal Vo (204).

In comparison to the circuit shown in FIG. 1 that simply combines a rectifier circuit in series with a separate regulator circuit, the embodiment of FIG. 2 realizes a number of benefits. One such benefit is that the circuit (200) uses fewer circuit components. For example, the embodiment of FIG. 2 has at least one fewer filter capacitor (e.g., Cb versus Cb1 and Cb2) and one fewer FET (e.g., Ms versus M1 and M2). As a result, the improved embodiment of FIG. 2 is more compact, thereby allowing room for additional circuit components and creating flexibility to incorporate additional features into an associated device that may otherwise be unfeasible. For example, in the context of biomedical implants, a circuit such as circuit (200) is sometimes designed to fit within an implantable device that is the size of a grain of rice. Therefore, it is imperative that designs of such circuits be both compact and space efficient.

Furthermore, from a performance standpoint, both overall voltage conversion efficiency and maximum power efficiency are improved. With respect to the disclosed embodiments, voltage conversion efficiency is sometimes expressed as: Vo/min[Vacp], where Vo is the output signal Vo (204), and min[Vacp] is the minimum peak voltage requirement for Vac (202) for a desired output voltage Vo. As described previously, the min[Vacp] for the conventional embodiment of FIG. 1 is equal to Vo+Vdo+Vd, whereas the min[Vacp] for the improved embodiment of FIG. 2 is Vo+Vs. For example, Vs, Vdo and Vd can have relatively the same voltage value in the range between 200 mV and 500 mV. Therefore, because a greater dropout voltage is measured in the conventional embodiment as a result of using an additional switching transistor (e.g., FET M1 (122) and M2 (124)), the embodiment of FIG. 2 achieves improved voltage conversion efficiency over the embodiment of FIG. 1.

Similarly, maximum power efficiency is also related to dropout voltage. With respect to the disclosed embodiments, maximum power efficiency is sometimes expressed as the load power dissipated on a load resistor (e.g., resistor RL (138)), divided by the input power from the input signal (e.g., input signal Vac (102)) at min[Vacp]. Again, due to the greater dropout voltage of the conventional designs shown in FIG. 1, maximum power efficiency is improved over conventional designs with the improved embodiment of FIG. 2.

Figure 3A:
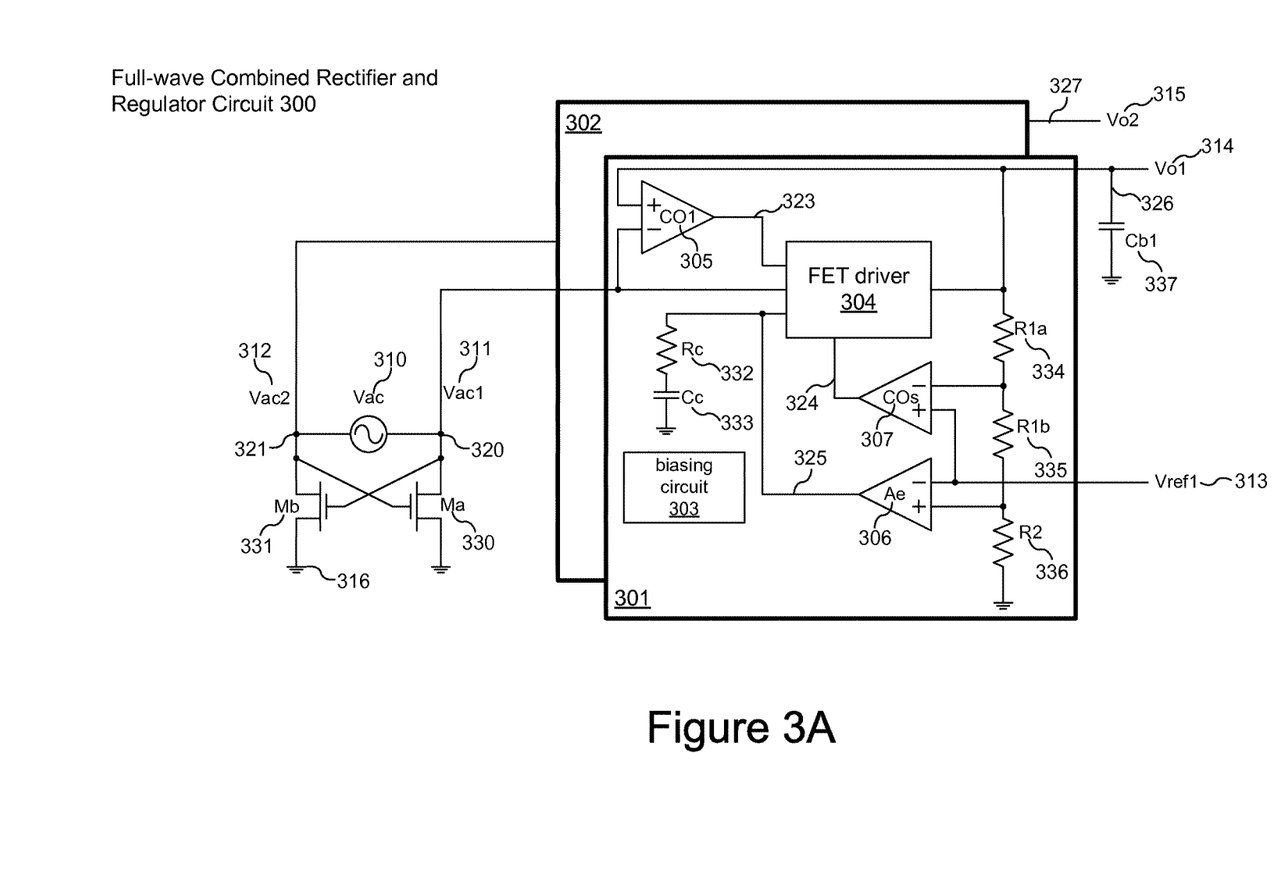
FIGS. 3A-3C are schematic diagrams of a full-wave combined rectifier and regulator circuit and various sub-circuits, in accordance with some embodiments.
Figure 3B:
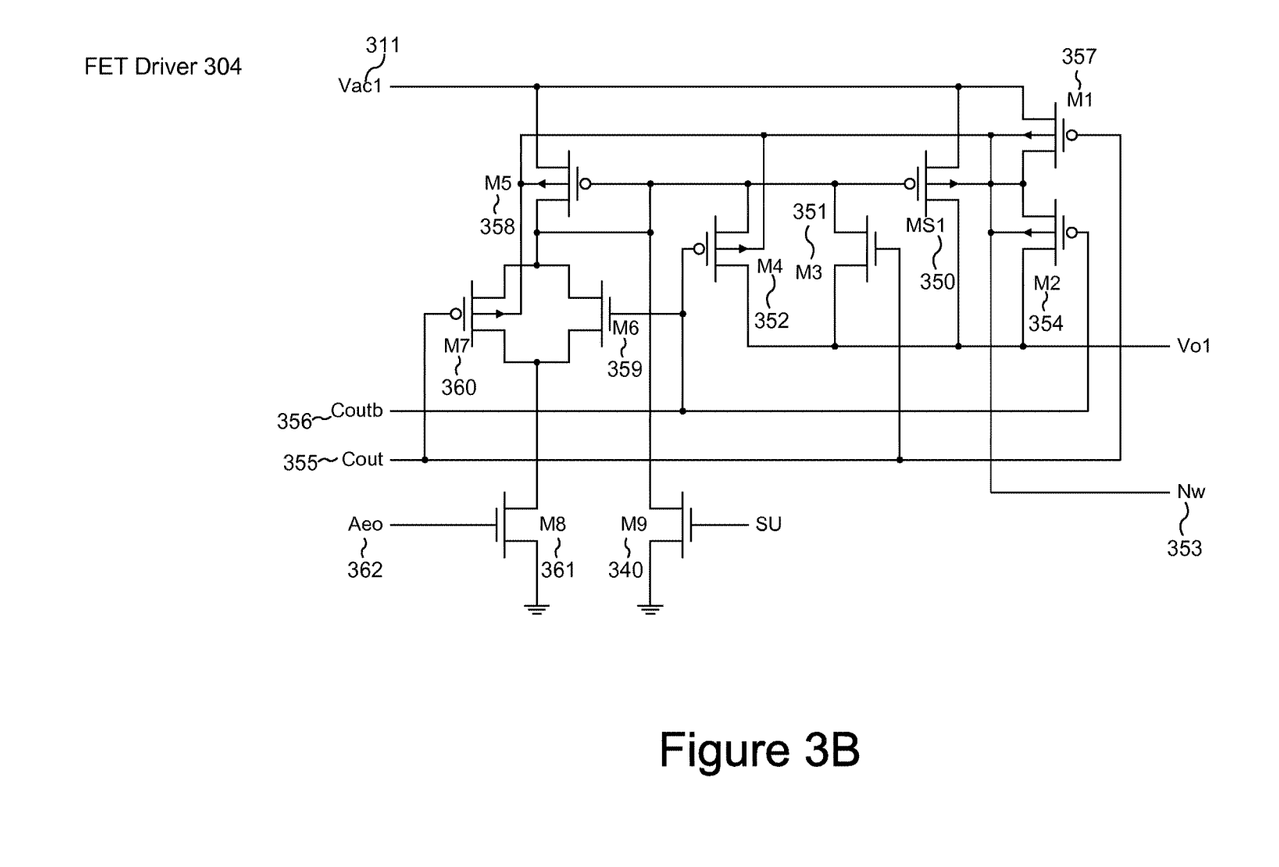
Figure 3C:
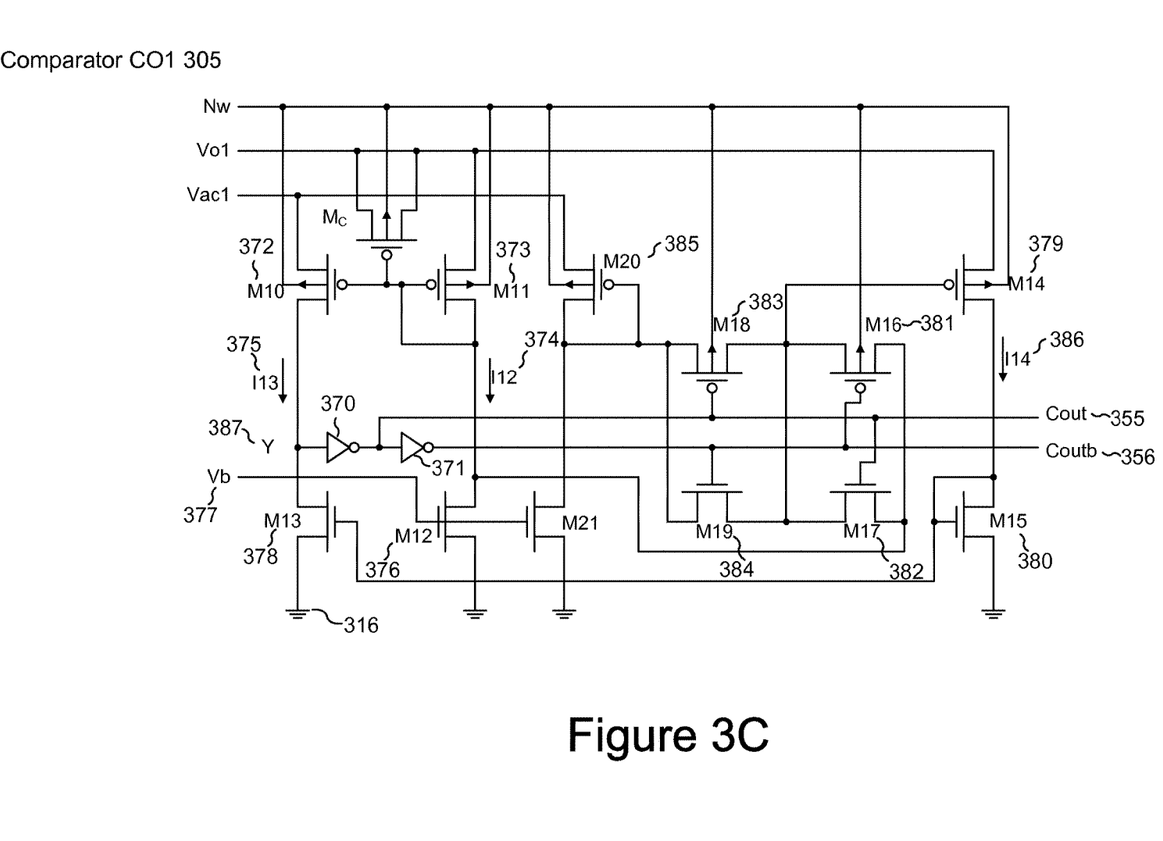

FIGS. 3A-3C are schematic diagrams of a full-wave combined rectifier and regulator (300) and various sub-circuits, in accordance with some embodiments.

In particular, FIG. 3A illustrates a full-wave combined rectifier and regulator circuit (300), in accordance with some embodiments. The full-wave embodiment shown in FIG. 3A operates similarly to the half-wave embodiment of FIG. 2. However, by cross-coupling a first FET Ma (330) and a second FET Mb (331), and by utilizing two half-wave combined rectifier and regulator circuits (e.g., (301) and (302)), the full-wave combined rectifier and regulator circuit (300) is able to achieve full-wave rectification and regulation. As shown, the input signal Vac1 (311) and the input signal Vac2 (312), which comprise an input signal Vac (310), are half-wave rectified input signals that are generated on a first input node (320) and a second input node (321), respectively. As shown, the input signal Vac1 (311), the input signal Vac2 (312), and the input signal Vac (310), are unrectified and unregulated signals. The voltage swings on the first input node (320) and the second input node (321) are now reduced to be between ~0V and ~Vacp, where Vacp is a peak value of the input signal Vac (310). The half-wave combined rectifier and regulator circuits (301) and (302) provide two output signals Vo1 (314) and Vo2 (315) at output nodes (326) and (327), respectively, which can be connected together as a single output if desired. As shown, the output signals Vo1 (314) and Vo2 (315) are rectified and regulated signals. In the embodiment shown, each of half-wave combined rectifier and regulator circuits (301) and (302) consists of a FET driver circuit (304), a comparator CO1 (305), an error amplifier Ae (306), a biasing circuit (303), and a start-up comparator COs (307). Furthermore, in some embodiments, each half-wave combined rectifier and regulator circuit further comprises optional resistors Rc (332), R1a (334), R1b (335), and R2 (336), in addition to capacitors Cc (333) and Cb1 (337). In some embodiments, the total resistance of R1a (334) and R1b (335) is equal to R1 (230) in FIG. 2.

FIG. 3B illustrates a FET driver circuit (304), in accordance with some embodiments. In some embodiments, the FET driver circuit (304) includes a FET Ms1 (350), which is similar to the FET Ms in the half-wave combined rectifier and regulator circuit (200) embodiment of FIG. 2 and the circuitry driving it. As the terminal voltage of the FET Ms1 (350) can swing between ~0V and ~Vacp at the first input node (320), it can therefore have a voltage lower than the output signal Vo1 (314). In order to prevent current flowing from the output node (326) back to the first input node (320) when the input signal Vac1 (311) is less than the output signal Vo1 (314) (i.e., Vac1<Vo1), the gate of the FET Ms1 (350) is coupled to the output signal Vo1 (314) through FET M3 (351) and M4 (352), and the bulk of FET Ms1 (350) (which is coupled to node Nw (353)) is coupled to the output signal Vo1 (314) through FET M2 (354).

In the disclosed embodiment, the condition for Vac1<Vo1 is detected using the comparator CO1 (305). The output signals of the comparator CO1 (305) are Cout (355) and Coutb (356), as shown in FIG. 3B. When Vac1>Vo1, the node Nw (353) is disconnected from the output signal Vo1 (314) by switching off the FET M2 (354), and the node Nw (353) is then connected to the input signal Vac1 (311) by switching on the FET M1 (357). It can be seen that the signal at the node Nw (353) has a voltage swing between Vo1 and ~Vacp. As the signal at the node Nw (353) has the highest potential in the combined rectifier and regulator circuit, it is therefore used for biasing the bulks of the PMOS FETs to prevent any undesired current conduction due to the parasitic diodes and the parasitic transistors of the PMOS FETs. In some embodiments, when Vac1>Vo1, the gate of the FET Ms1 (350) is driven by the error amplifier Ae (306). However, in some embodiments, the supply voltage of the error amplifier Ae (306) and the biasing circuit are derived from the output signal Vo1 (314), which can sometimes be regulated to a voltage much lower than Vacp. As a result, the error amplifier Ae (306) may not have a sufficient output swing to control the FET Ms1 (350). To overcome this issue, FETs M5 (358)-M8 (361) are added between the output Aeo of the error amplifier Ae (362) and the gate of the FET Ms1 (350), as shown in FIG. 3B. When Vac1>Vo1, FET M6 (359) and FET M7 (360) will be turned on by the comparator CO1 (305) and there will be a current flow between FET M5 (358) and FET M8 (361). FETs M5 (358)-M8 (361) will then act as an inverting gain stage with FET M5 (358) being an active load connected to the input signal Vac1 (311) such that this gain stage will have sufficient voltage swing to control the FET Ms1 (350). In some embodiments, the FET Ms1 (350) has a much larger W/L ratio than the W/L ratio of the FET M5 (358) to allow for a large output current.

FIG. 3C illustrates a comparator CO1 (305), in accordance with some embodiments. The bulk voltage of the PMOS FETs at node Nw (353) is obtained from the FET driver circuit (304). In some embodiments, the voltage at node Nw (353) is also used for supplying the two inverters (370) and (371). FETs M10 (372) and M11 (373) are used for comparing the input signal Vac1 (311) and the output signal Vo1 (314). The biasing current I12 (374) of FET M11 (373) is set by FET M12 (376) through the biasing voltage Vb (377). The biasing current I13 (375) of FET M10 (372) is controlled through FETs M13 (378)-M15 (380). When Vac1<Vo1, the biasing current I13 (375) is approximately equal to the biasing current I12 (374) since the gate of FET M14 (379) is connected to FET M11 (373) through FETs M16 (381) and M17 (382), which are turned on by the two inverters (370) and (371). When Vac1>Vo1, the output values of the inverters will change. As a result, FETs M16 (381) and M17 (382) will be off and FETs M18 (383) and M19 (384) will be on. The gate voltage of FET M12 (376) now depends on the input signal Vac1 (311) via FET M20 (385). Hence, current I14 (386) and biasing current I13 (375) will increase as the input signal Vac1 (311) decreases from its peak value, causing node Y (387) to switch to ground (316) before the input signal Vac1 (311) equals the output signal Vo1 (314). As a result of the earlier switching, the switches in the FET driver circuit (304) will turn on or off slightly earlier to minimize the current flow back from the output node (326) back to the first input node (320). This earlier switching is also used for compensating the delays due to the inverters as well as the comparison stage consisting of FETs M10 (372) through M13 (378).

During initial start-up, the output signal Vo1 (314) is charged up mainly by the parasitic diode associated with the FET Ms1 (350) in FIG. 3B. Since the FET Ms1 (350) may not have turned on properly, the output signal Vo1 (314) may only charge up to <1V in simulation. For a proper start-up, a simple and low speed start-up comparator COs (307) shown in FIG. 3A is optionally added to compare k·Vo1 to Vref1, where k is set by resistors R1a (334), R1b (335), and R2 (336), and Vref1 is the reference voltage Vref1 (313). When k·Vo1<Vref1, a start-up signal at node (324) will have a logic "high" and a start-up FET M9 (340), shown in FIG. 3B, will turn on. As a result, the FET Ms1 (350) will be turned on initially to charge up the output signal Vo1 (314). When k·Vo1>Vref1, the start-up FET M9 (340) will turn off and the FET Ms1 (350) will be controlled by the error amplifier Ae (306) and the comparator CO1 (305), as discussed above. In some embodiments, the error amplifier Ae (306) is realized using a simple folded-cascode amplifier with resistor Rc (332) and capacitor Cc (333) (FIG. 3A) added at the output for the overall frequency compensation of the full-wave combined rectifier and regulator circuit (300).

Figure 4:
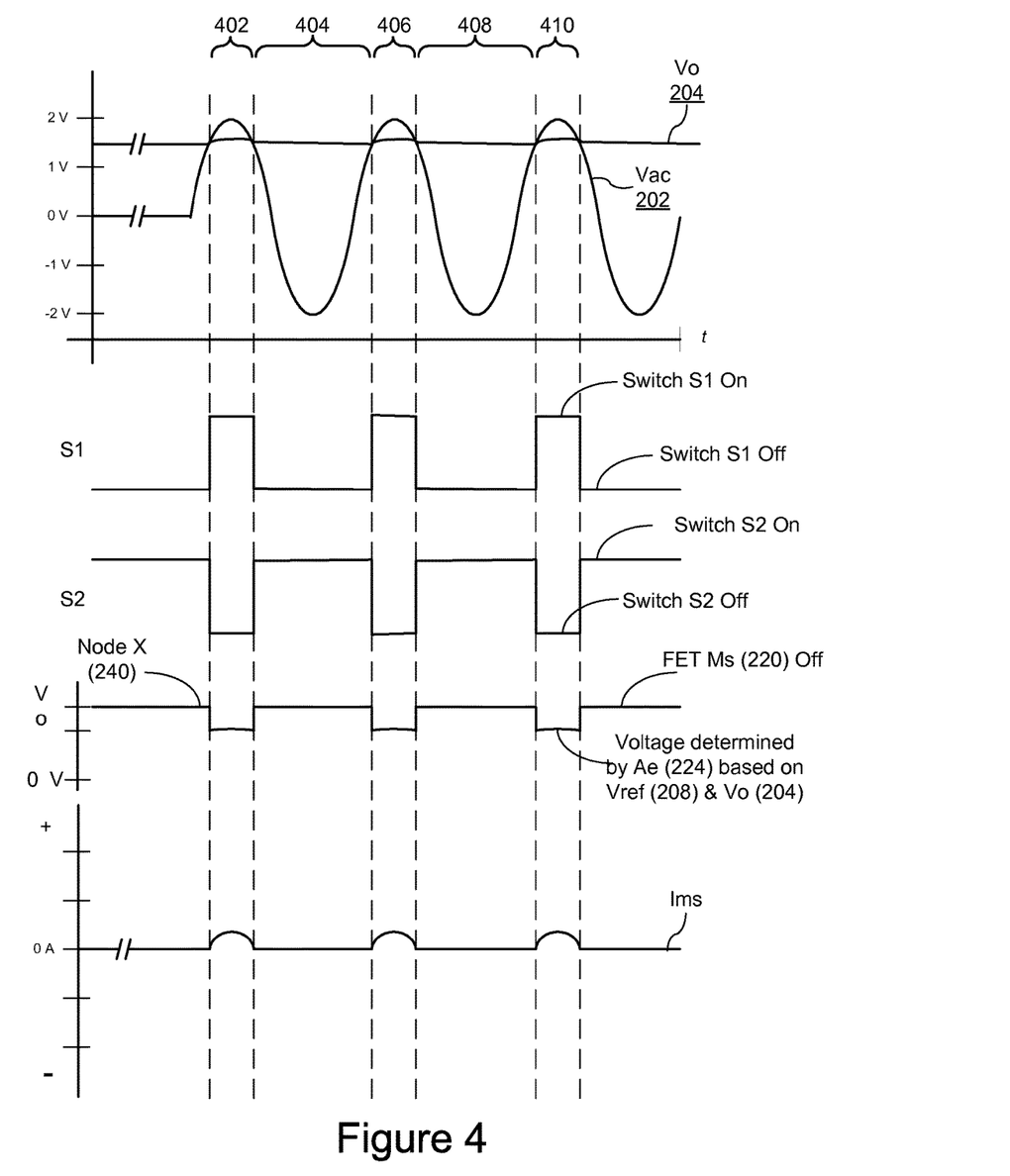
FIG. 4 is an illustration of a continuous time-domain plot illustrating the operation of the circuit of FIG. 2, in accordance with some embodiments.

FIG. 4 is an illustration of a continuous time-domain plot illustrating the operation of a half-wave combined rectifier and regulator circuit (200), in accordance with some embodiments. Specifically, FIG. 4 is a non-limiting example made with reference to the half-wave combined rectifier and regulator circuit (200) of FIG. 2. The exemplary continuous time-domain plot of the input signal Vac (202) and the output signal Vo (204) of FIG. 2 is shown in relation to the timing of switches S1 (226) and S2 (228), and the current Ims across the FET Ms (220).

As described above in FIG. 2, during the time period (402), the input signal Vac (202) at the input node (212) is greater than the output signal Vo (204) at the output node (214), wherein the output signal Vo (204) is a rectified and regulated signal, and the input signal Vac (202) is an unrectified and unregulated signal. As a result, the comparator CO1 (222) produces a logic "high" switching signal that enables (closes) switch S1 (226) and couples the gate terminal of the FET Ms (220) to the error amplifier Ae (224), while disabling (opening) S2 (228). Thus, the error amplifier Ae (224) controls the FET Ms (220) and regulates the output signal Vo (204) to a desired output voltage of $$Vref\left(1 + \frac{R1}{R2}\right).$$

Specifically, during the time period (402), the error amplifier Ae (224) computes a difference between the reference voltage Vref (208) and the scaled output signal at node (216), and produces an output voltage based on the difference. When the magnitude of the reference voltage Vref (208) exceeds the magnitude of the scaled output signal at node (216), the FET Ms (220) is conductive (i.e., is closed and turned "on"). Consequently, current then flows across the FET Ms (220) from the input node (212) to the output node (214), and power transfer from the input node (212) to the output node (214) is regulated to produce the rectified and regulated output signal Vo (204), as shown by the positive current Ims in FIG. 4. Any capacitive loads coupled to the output node (214) (e.g., capacitor Cb (236)) is charged during this time to the desired output voltage, expressed as:

$$Vref\left(1 + \frac{R1}{R2}\right).$$

When the magnitude of the scaled output signal at node (216) exceeds the magnitude of the reference voltage Vref (208), the FET Ms (220) does not conduct (i.e., is open and turned "off"), preventing current from flowing from the input node (212) to the output node (214). At this time, the capacitive loads coupled to the output node (214) begin to gradually discharge due to the current drawn by the equivalent loading resistance RL (234) as well as resistors—R1 (230) and R2 (232). As shown in FIG. 4, the half-wave combined rectifier and regulator circuit (200) operates in the manner described above at other times when the input signal Vac (202) is greater than the output signal Vo (204) (e.g., during time periods (406) and (410)).

During the time period (404), the output signal Vo (204) at the output node (214) is greater than the input signal Vac (202) at the input node (212). As a result, the comparator CO1 (222) produces a logic "high" switching signal that enables switch S2 (228) and couples the gate terminal of the FET Ms (220) to the output node (214), but disables S1 (226). Consequently, assuming the output signal Vo (204) exceeds the device threshold requirements of FET Ms (220), the FET Ms (220) does not conduct (i.e., turned "off"), thus preventing current flow from the input node (212) to the output node (214), as shown by the current Ims in FIG. 4 which has a substantially zero current value. During this time, any capacitive loads coupled to the output node (214) (e.g., capacitor Cb (236)) continue to gradually discharge. As shown in FIG. 4, the half-wave combined rectifier and regulator circuit (200) operates in the manner described above at other times when the output signal Vo (204) is greater than the input signal Vac (202) (e.g., during time periods (408)).

Figure 5A:
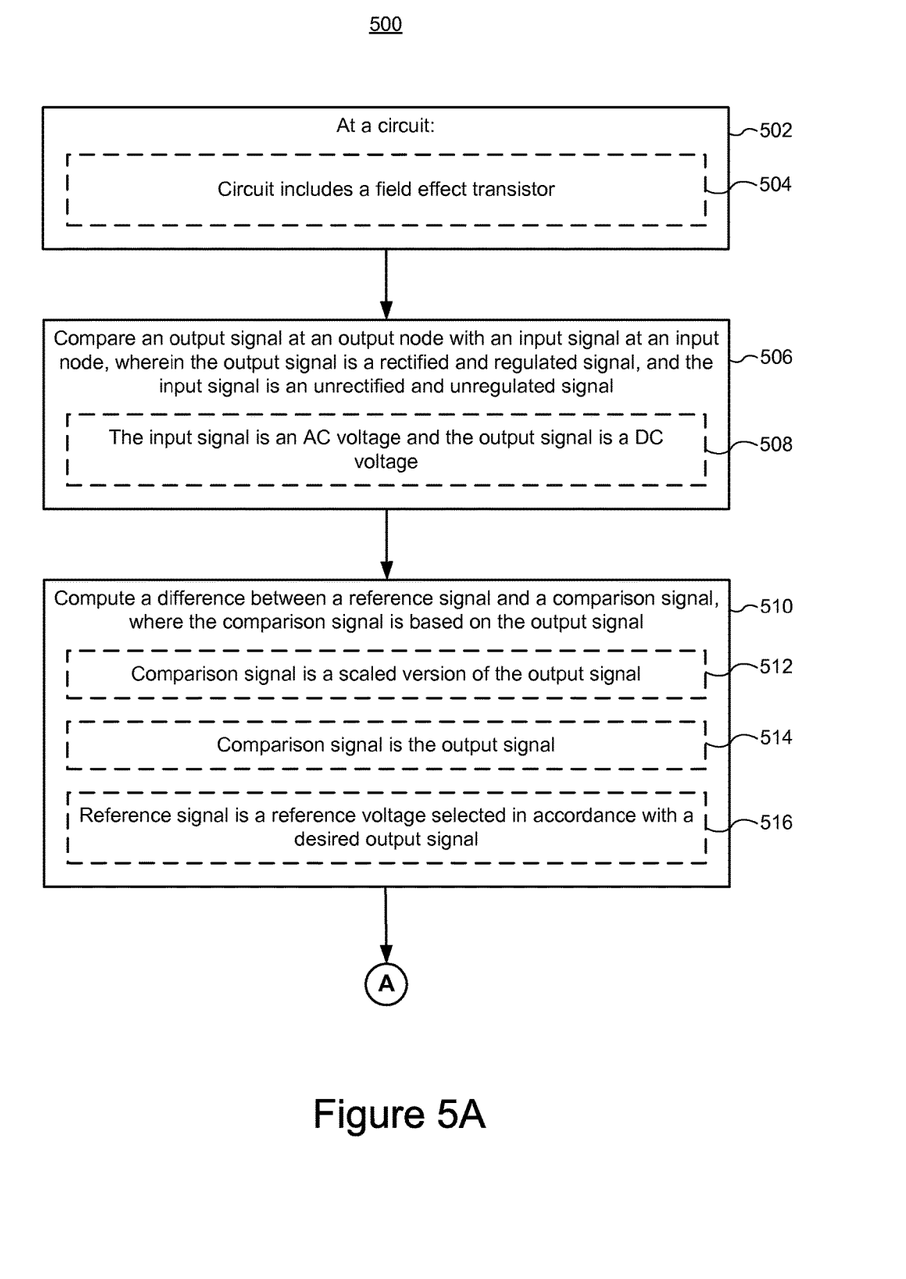
FIGS. 5A-5B illustrate a flowchart representation of a method of producing a rectified and regulated output signal, in accordance with some embodiments.
Figure 5B:
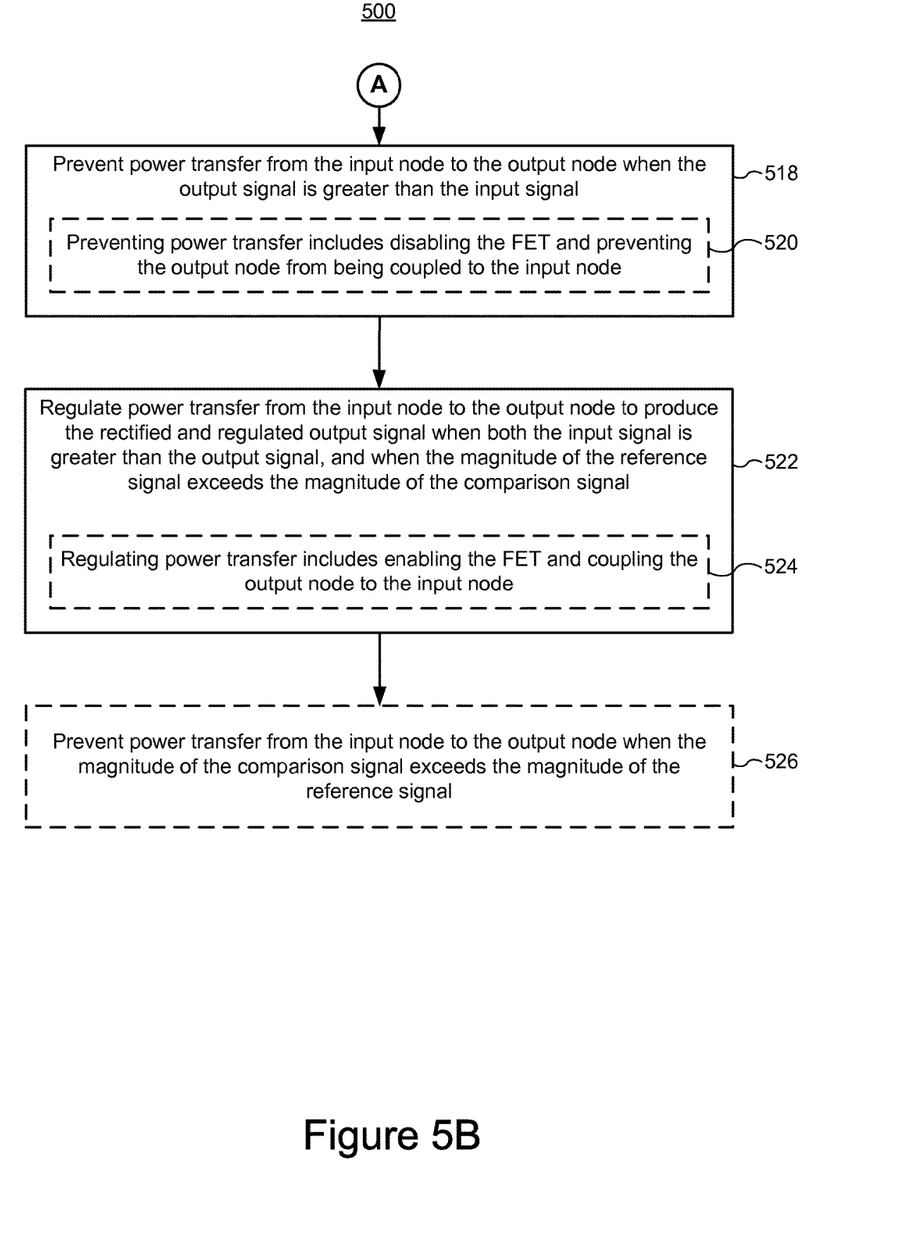

FIGS. 5A-5B illustrate a flowchart representation of a method (500) of producing a rectified and regulated output signal, in accordance with some embodiments.

The method (500) is performed (502) at a circuit. In some embodiments, a circuit for rectifying and regulating an input signal (e.g., half-wave combined rectifier and regulator circuit (200) of FIG. 2, full-wave combined rectifier and regulator circuit (300) of FIG. 3), or one or more components thereof (e.g., comparator CO1 (222), error amplifier Ae (224), etc.), performs one or more steps of the method (500). In some embodiments, the circuit includes (504) a FET (e.g., the FET Ms (220), FIG. 2). Furthermore, in some embodiments, the FET (e.g., the FET Ms (220)) is configured to selectively couple an input node (e.g., the input node (212)) to an output node (e.g., the output node (214)), thereby controlling the flow of current across the FET and between the two nodes.

An output signal at an output node is compared (506) with an input signal at an input node, wherein the output signal is a rectified and regulated signal, and the input signal is an unrectified and unregulated signal. For example, as described above in FIG. 2, the comparator CO1 (222) compares the input signal Vac (202) with the output signal Vo (204). In some embodiments, the input signal is an AC voltage and the output signal is a DC voltage (508).

Furthermore, a difference between a reference signal and a comparison signal is computed (510), where the comparison signal is based on the output signal. In some embodiments, the comparison signal is (512) a scaled version of the output signal (e.g., signal at node 216 in FIG. 2, which is the output signal Vo (204) scaled by resistors R1 (230) and R2 (232)). In other embodiments, the comparison signal is (514) the output signal (e.g., the output signal Vo (204)). In some embodiments, the reference signal (e.g., the reference voltage Vref (280)) is a reference voltage selected (516) in accordance with a desired output signal. As described above, in some embodiments, the reference voltage (e.g., the reference voltage Vref (280)) and resistors (e.g., resistors R1 (230) and R2 (232)) are selected to achieve a desired output voltage expressed as:

$$Vref\left(1 + \frac{R1}{R2}\right).$$

In some embodiments, the comparing step of (506) and the computing step of (510) are performed concurrently. In other embodiments, the difference between the reference signal and the comparison signal is computed (step (510)) only when the input signal is greater than the output signal. Furthermore, in some embodiments, the comparing step of (506) and the computing step of (510) are performed in accordance with a respective predefined frequency (e.g., the comparator CO1 (222) operates at a frequency of f=10 MHz) and/or duty cycle.

Power transfer from the input node to the output node is prevented (518) when the output signal is greater than the input signal. According to some embodiments, preventing power transfer includes (52) disabling the FET and preventing the output node from being coupled to the input node. For example, as described above with respect to FIG. 2, if the output signal Vo (204) exceeds the input signal Vac (202), the comparator CO1 (222) produces a switching signal that corresponds to a logic "high" value, coupling the gate terminal of FET Ms (220) to the output node (214). Thus, the FET Ms (220) does not conduct (i.e., turned "off"), and current does not flow from the input node (212) to the output node (214).

However, power transfer from the input node to the output node is regulated (522) to produce the rectified and regulated output signal when both the input signal is greater than the output signal, and when the magnitude of the reference signal exceeds the magnitude of the comparison signal. According to some embodiments, regulating power transfer includes (524) enabling the FET and coupling the output node to the input node. For example, as described above with respect to FIG. 2, if the input signal Vac (202) exceeds the output signal Vo (204), the comparator CO1 (222) produces a switching signal that corresponds to a logic "low" value, coupling the gate terminal of FET Ms (220) to the output of the error amplifier Ae (224). As a result, the current flow across the FET Ms (220) is controlled by an output voltage at the output of the error amplifier Ae (224), where the output voltage is produced by computing a difference between the reference voltage Vref (208) and the scaled output signal at node (216). Thus, in this example, when the magnitude of the reference voltage Vref (208) exceeds the magnitude of the scaled output signal at node (216), the FET Ms (220) conducts (i.e., is closed or turned "on") and current then flows from the input node (212) to the output node (214). As a result, power transfer from the input node (212) to the output node (214) is regulated to produce the rectified and regulated output signal Vo (204). In some embodiments, power transfer from the input node to the output node is prevented (526) when the magnitude of the comparison signal exceeds the magnitude of the reference signal.

It should be understood that the particular order in which the operations in FIGS. 5A-5B have been described is merely exemplary and is not intended to indicate that the described order is the only order in which the operations could be performed. One of ordinary skill in the art would recognize various ways to reorder the operations described herein.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for producing a rectified and regulated output signal, comprising:
   at a circuit:
   comparing, using a comparator, an output signal at an output node with an input signal at an input node, wherein the output signal is a rectified and regulated signal, and the input signal is an unrectified and unregulated signal, to produce a switching signal;

computing a difference between a reference signal and a comparison signal, where the comparison signal is based on the output signal, using an error amplifier with an error amplifier output node;

coupling the input node and output node with a FET, coupling the error amplifier output node to the FET with a first switch, and coupling the output node to the FET with a second switch, using the switching signal produced by the comparator to enable one of the first switch and second switch, while not enabling the other of the first switch and second switch;

preventing power transfer from the input node to the output node when the output signal is greater than the input signal; and regulating power transfer from the input node to the output node to produce the rectified and regulated output signal when both the input signal is greater than the output signal, and when the magnitude of the reference signal exceeds the magnitude of the comparison signal.

2. The method of claim 1, wherein the comparison signal is a scaled version of the output signal.

3. The method of claim 1, wherein the comparison signal is the output signal.

4. The method of claim 1, wherein the input signal is an AC voltage and the output signal is a DC voltage.

5. The method of claim 1, further comprising:

preventing power transfer from the input node to the output node when the magnitude of the comparison signal exceeds the magnitude of the reference signal.

6. The method of claim 1, wherein the reference signal is a reference voltage selected in accordance with a desired output signal.

7. A circuit for producing a rectified and regulated output signal, comprising:

an input node configured to be coupled to an input signal, wherein the input signal is an unrectified and unregulated signal;

an output node configured to provide an output signal, wherein the output signal is a rectified and regulated signal;

a comparator, comprising:
  a first input node of the comparator configured to be coupled to the input node,
  a second input node of the comparator configured to be coupled to the output node, and
  a comparator output node, wherein the comparator is configured to produce a switching signal at the comparator output node;

an error amplifier, comprising:
  a first input node of the error amplifier configured to be coupled to a reference signal,
  a second input node of the error amplifier configured to be coupled to a comparison signal, where the comparison signal is based on the output signal, and
  an error amplifier output node, wherein the error amplifier is configured to produce an output voltage at the error amplifier output node, a FET configured to couple the input node and output node, a first switch configured to couple the error amplifier output node to the FET, and a second switch configured to couple the output node to the FET, wherein the switching signal produced by the comparator enables one of the first switch and second switch, while not enabling the other of the first switch and second switch.

8. The circuit of claim 7, wherein the comparison signal is a scaled version of the output signal.

9. The circuit of claim 7, wherein the input signal is an AC voltage and the output signal is a DC voltage.

10. The circuit of claim 7, wherein the reference signal is a reference voltage selected in accordance with a desired output signal.

11. The circuit of claim 7, wherein the second input node of the error amplifier is coupled to the output node through a voltage divider circuit.

12. The circuit of claim 7, wherein the switching signal enables the first switch and couples the error amplifier output node to the FET when the input signal exceeds the output signal.

13. The circuit of claim 12, wherein the output voltage enables the FET, allowing power transfer between the input node and the output node.

14. The circuit of claim 7, wherein the switching signal enables the second switch and couples the output node to the FET when the output signal exceeds the input signal.

15. The circuit of claim 14, wherein coupling the output node to the FET causes the FET to prevent power transfer between the input node and the output node.

16. The circuit of claim 14, wherein the output voltage is based on the difference between the reference signal and the comparison signal.

\* \* \* \* \*